Sept. 4, 1945.　　　J. E. HERRON　　　2,384,305
ENGINE PISTON
Filed Jan. 15, 1941　　2 Sheets-Sheet 1

Inventor
Joseph E. Herron,
Attorney

Sept. 4, 1945.　　　J. E. HERRON　　　2,384,305
ENGINE PISTON
Filed Jan. 15, 1941　　2 Sheets-Sheet 2

Inventor:
Joseph E. Herron,
By W. W. Williamson
Attorney.

Patented Sept. 4, 1945

2,384,305

UNITED STATES PATENT OFFICE 2,384,305

ENGINE PISTON

Joseph E. Herron, Philadelphia, Pa.

Application January 15, 1941, Serial No. 374,514

2 Claims. (Cl. 309—15)

My invention relates to a new and useful engine piston and has for one of its objects to provide a two piece piston including a head and a skirt so connected to one another that they may have some lateral movements relative to each other and the head carrying sealing rings coacting with the compression ring to seal the space between the inner circumference of said compression ring and the wall of the piston at the inner end of a groove that contains the rings.

I believe that with the present day pistons and rings in general use the cause of the extreme wear at the top of the cylinder walls and what is known as compression knocks is due to the compression behind the top or compression ring since the more the engine is throttled the greater the compression and also the greater the knock. I contend that due to the gases being ignited before the piston reaches the top of the stroke, the compression is the greatest both on top of the piston and in back of the top or compression ring, where the pressure is so great as to squash out the oil, by the time the piston comes to a standstill at the top of its stroke, the heat action causes the ring to be almost welded to the cylinder wall. During this upstroke, the thrust is to one side. Thereafter the connecting rod passes over the top center and then the thrust is to the opposite side of the cylinder forcing the piston over at the bottom end first and as the piston moves down and breaks the top ring loose from the cylinder wall, at that same instant the top of the piston is thrust over causing the knock and allowing the gases to get past the top ring and also causing the sharp edge of the ring to cut into the cylinder wall and consequently rounding the edge of the ring.

Therefore, another object of this invention is to overcome the disadvantages above enumerated by providing a piston of two sections, one to take the side thrusts and the other to travel in a straight line and carry a sealed compression ring which will not permit compressed gases to get behind said ring and force the same outward.

Another object of the invention is to construct a piston in two sections consisting of a head or upper ring section and a skirt or lower thrust section, said sections being connected together by a strut capable of flexion to allow the skirt to be thrust from side to side while the head section travels in a true or straight course with the cylinder walls, and means to maintain the piston sections in alignment or prevent rotation relative to one another.

A further object of the invention is to provide the head or ring section of the piston with a ring groove of special formation and mount therein any ordinary compression ring with sealing rings on both sides thereof, the lines of tension of the sealing rings being opposite to that of the compression ring and closing the gap behind the compression ring so that only its inherent tension acts upon the cylinder walls. This will cause the compression ring to engage the cylinder walls with the same tension throughout the entire stroke of the piston and there will be no excessive wear on any particular areas of the cylinder walls.

A still further object of this invention is to provide for sealing any space or gap behind a compression ring of a piston.

With the above and other objects in view, this invention consists of the details of construction and combination of elements hereinafter set forth and then designated by the claims.

In order that those skilled in the art to which this invention appertains may understand how to make and use the same, I will describe its construction in detail, referring by numerals to the accompanying drawings forming a part hereof, in which.

Figure 1:
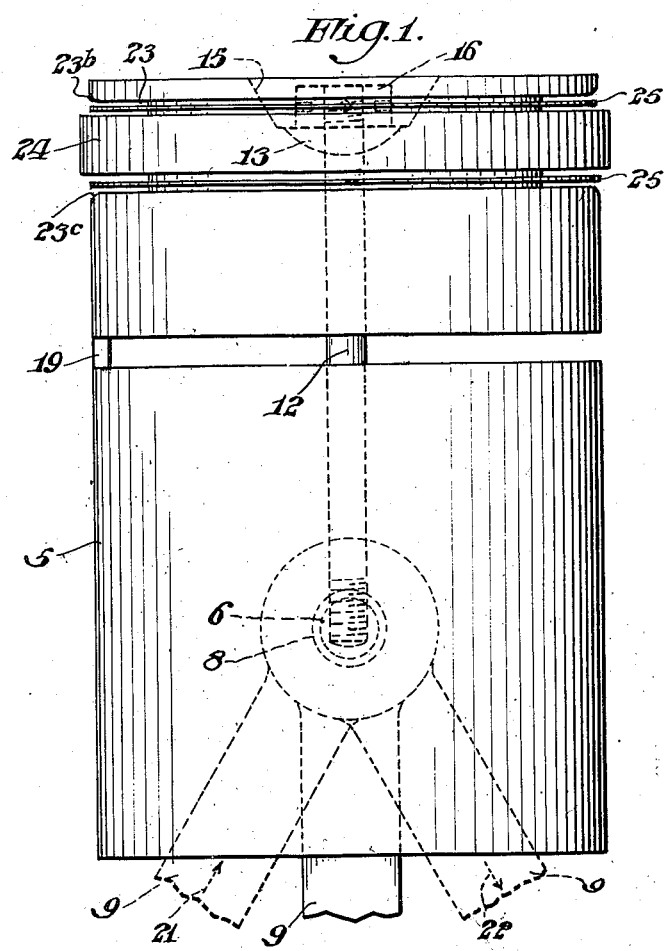
Fig. 1 is a side elevation of an engine piston embodying my invention, the ring groove being slightly exaggerated to more plainly illustrate the structure.
Figure 3:
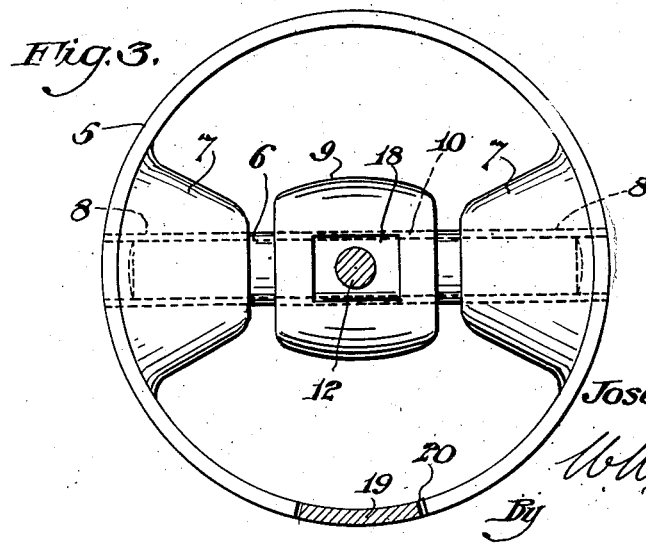
Fig. 3 is a cross section on the line 3—3 of Fig. 2.

In carrying out my invention as herein embodied 5 represents the cylindrical skirt or thrust section of the piston across one diameter of which is located the wrist pin 6 suitably mounted in the walls of said skirt. For convenience of illustration I have shown the usual bearing lugs 7 on the inside of the skirt and containing bushings 8. On the wrist pin 6 is journalled the connecting or piston rod 9 which, as usual, is connected with a crank shaft. A bushing 10 may be placed in the wrist pin bearing of the connecting rod.

The reference numeral 11 denotes the head or ring section of the piston and is attached to the outer end of the strut 12 capable of flexion and having a collar 13 that bears against the underside of the end wall of the head and said strut projects through a hole 14 in said end wall of the head and preferably into a recess 15 in the outer surface of said end wall. A nut 16, preferably having spanner wrench receiving apertures 17, may be screwed onto the projecting end of the strut within the recess 15 to secure the head and strut together but of course other equivalent means of securing may be utilized.

The inner end of the strut 12 passes through an opening 18 in the journal portion of the connecting rod 9 and a similar opening in the bushing 10, where one is provided, and is fixed in the wrist pin 6, as by threading said strut into said wrist pin. This permits the connecting rod or piston skirt and wrist pin to move laterally relative to one another and also allows said connecting rod to swing or rotate on the wrist pin without affecting the strut.

In order to maintain the sections in proper alignment or prevent the sections rotating relative to each other, the head 11 is provided with a tongue 19 projecting from the flange of said head and registering with a notch 20 in the upper edge of the skirt 5, there being a slight clearance between the side edges of the tongue and notch.

From this much of the description it will be apparent that the head or ring section of the piston will move in a straight line or a true course relative to the walls of the cylinder in which the piston is mounted, although the skirt or thrust section may be moved to diametrically opposite sides due to the flexibility of the strut 12. As shown in Fig. 1, when the piston moves upward on either the compression or exhaust stroke, the piston skirt 5 will be thrust towards one side as indicated by the arrow 21 whereas on the other strokes, especially the power stroke, the piston skirt will be thrust in the opposite direction as indicated by the arrow 22. With an ordinary piston this is what causes the engine cylinder to be worn to an elliptical shape in cross section and the resulting tilting tendency of the piston produces considerable wear in the upper end of the cylinder but with my construction of piston any such wear is limited to the lower part of the cylinder or the area within which the skirt of the piston operates.

Figure 4:
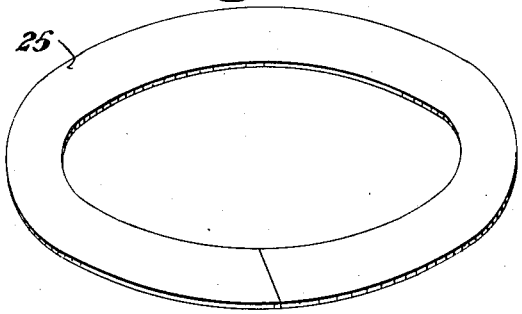
Fig. 4 is an isometric view of one of the sealing rings.

In the outer circumferential surface of the head or ring, section 11 of the piston is formed a ring groove 23 including a central portion 23a of shallow depth and two deeper end portions 23b and 23c, one at each end of the shallow portion. A compression or top ring 24 of the usual split type is located in the central shallow portion 23a and said compression ring has a spring tension away from the piston or towards the walls of the cylinder in which the piston is mounted. This forms a gap between the inner circumference of the ring and the contiguous wall of the piston head or ring section into which gap, in the old type of construction, gases flow and force the ring outward under excessive pressure. To seal this gap so that neither gases nor oil can enter the same a thin sealing ring 25 is located in each of the deeper portions 23b and 23c of the ring groove 23. These sealing rings are of the split type as disclosed in Fig. 4 and have a spring tension inward or towards the walls of the piston so that they have a tendency to close and hug or grip said walls of the piston at the inner circumferences of said rings. Said sealing rings should be from .015 to .020 of an inch thick, although they are not to be limited to such dimensions, and are of a width equal to the depth of the groove portions 23b and 23c so that their outer circumferences are substantially flush with the exterior circumference of the piston, especially the head or ring section thereof.

Figure 2:
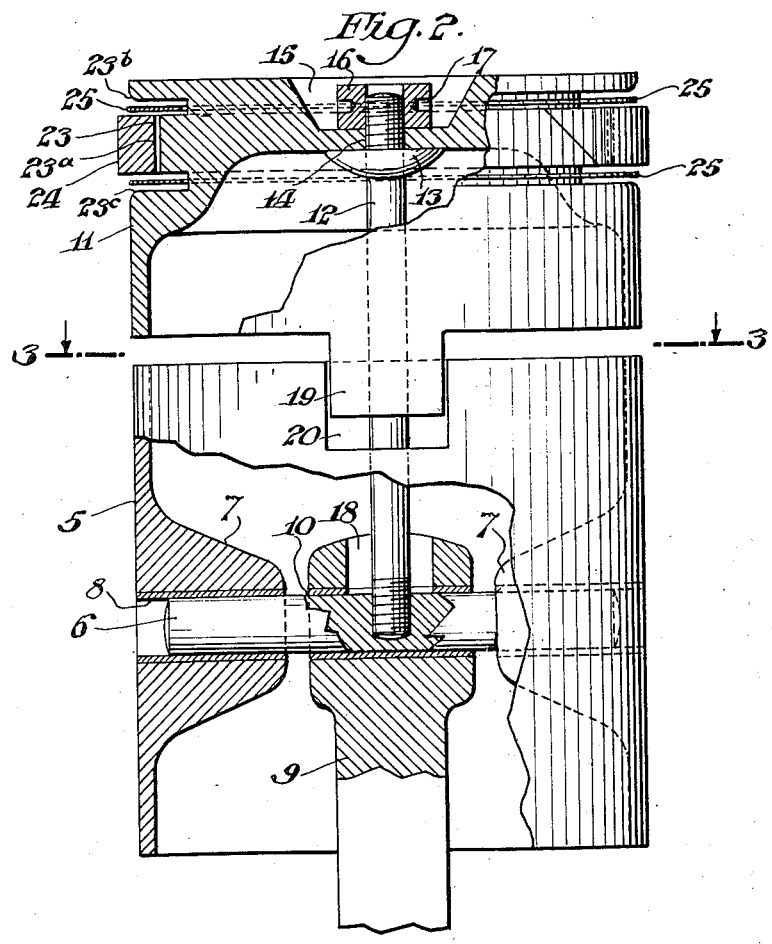
Fig. 2 is a sectional elevation of the same at right angles to Fig. 1.

By reference to Fig. 2, it will be obvious that the sealing rings 25 bridge the gap at the back of the compression ring or between the inner circumference of said compression ring and the contiguous longitudinal or base wall of the shallower portion 23a of the ring groove.

As previously stated the ring groove is shown in an exaggerated manner for purposes of illustration and in actual practice the deep portions 23b and 23c of said ring groove should be of a width just slightly greater than the thickness of the sealing rings.

During the upstroke or inward movement of the piston in a cylinder, the outer sealing ring 25, considered with relation to the piston, will be forced against the contiguous face of the compression ring and the inner end wall of the groove portion 23b thereby effectively sealing the gap in back of the compression ring to prevent entrance of gases behind said compression ring. This sealing effect will be maintained during the outward firing or power stroke since the pressure of the power medium will hold the sealing ring in proper relation to the compression ring. The sealing rings being relatively thin they can flex to follow the locations of the compression ring if and when it moves slightly in a longitudinal direction relative to the piston. During the operation above described, the inner sealing ring will limit the inward longitudinal movement of the compression ring.

When the piston is moving outward as on the fuel intake stroke, the inner sealing ring will engage the other face of the compression ring and the inner end wall of the groove portion 23c thereby again sealing the gap in back of the compression ring to prevent possible leakage or the passage of oil into the cylinder space beyond the head of the piston.

From the foregoing it will be apparent that since the head or ring section of the piston will positively move in a straight line, the sealing rings can function to effectively seal the gap behind the compression ring and prevent gases or oil from entering said gap in consequence of which said compression ring will be held in contact with the cylinder walls only by the inherent tension thereof, thus eliminating undue wear on the parts and increasing the compression of the power medium.

Of course I do not wish to be limited to the exact details of construction herein shown and described, as these may be varied within the scope of the appended claims without departing from the spirit of my invention.

Having described my invention, what I claim as new and useful is:

1. An engine piston having a ring groove consisting of a central shallow portion and end deeper portions producing shoulders flanking the central shallow portion, a main ring mounted in said central portion of the groove tensioned to spring outward and normally leaving a gap behind it, and sealing rings in the deeper portions of said groove coacting with the opposite flat faces of the main ring and bridging the gap.

2. The structure in claim 1 wherein the sealing rings are tensioned to spring inward.

JOSEPH E. HERRON.